United States Patent
Jose et al.

(10) Patent No.: US 12,035,331 B2
(45) Date of Patent: Jul. 9, 2024

(54) LTE RESOURCE ALLOCATION CONTROLLER

(71) Applicant: T-Mobile USA, Inc., Bellevue, WA (US)

(72) Inventors: Fnu Abin Jose, Tempe, AZ (US); Ashwini Kumar, Chandler, AZ (US); Emad Rezk, Concord, CA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/971,465

(22) Filed: Oct. 21, 2022

(65) Prior Publication Data

US 2023/0039620 A1     Feb. 9, 2023

Related U.S. Application Data

(63) Continuation of application No. 16/791,451, filed on Feb. 14, 2020, now Pat. No. 11,523,377.

(51) Int. Cl.
*H04W 72/23* (2023.01)
*H04W 72/52* (2023.01)

(52) U.S. Cl.
CPC .......... *H04W 72/23* (2023.01); *H04W 72/52* (2023.01)

(58) Field of Classification Search
CPC ...... H04W 72/23; H04W 72/52; H04W 28/16
See application file for complete search history.

(56) References Cited

U.S. PATENT DOCUMENTS

| | | | |
|---|---|---|---|
| 9,991,998 B2 | 6/2018 | Peng et al. | |
| 10,455,583 B1 * | 10/2019 | Liu | H04W 72/046 |
| 10,856,175 B1 | 12/2020 | Broyles et al. | |
| 2007/0109956 A1 | 5/2007 | Kwon et al. | |
| 2007/0274288 A1 | 11/2007 | Smith et al. | |
| 2008/0240030 A1 | 10/2008 | Kolding et al. | |

(Continued)

FOREIGN PATENT DOCUMENTS

WO    2020000446 A1    1/2020

OTHER PUBLICATIONS

U.S. Appl. No. 16/791,451, Final Office Action mailed May 11, 2022, 31 pages.

(Continued)

*Primary Examiner* — Ayaz R Sheikh
*Assistant Examiner* — Tarell A Hampton

(57) ABSTRACT

This disclosure describes techniques for optimizing the allocation of physical resource blocks (PRBs) for user equipment (UE), such as a Narrow-Band Internet of Things (NB-IoT) device, within a Long-Term Evolution (LTE) spectrum. More specifically, a resource allocation controller that is configured to select one of at least two resource allocation algorithms that allocate physical resources within an LTE spectrum, based on an identity of the UE and an analysis of real-time or near real-time physical resource utilization and control utilization within the LTE spectrum. In one example, the resource allocation controller may analyze the physical resource utilization and control utilization within a subframe of an LTE spectrum to determine whether to allocate an exact or near-exact number of PRBs for data communications of a UE (i.e. NB-IoT device), or whether to allocate a PRB group (at least four PRBs) for data communications of the UE.

20 Claims, 9 Drawing Sheets

(56) References Cited

U.S. PATENT DOCUMENTS

| | | |
|---|---|---|
| 2009/0170522 A1 | 7/2009 | Tirkkonen et al. |
| 2009/0325590 A1 | 12/2009 | Liu et al. |
| 2010/0157831 A1 | 6/2010 | Takeuchi et al. |
| 2011/0075624 A1 | 3/2011 | Papasakellariou et al. |
| 2011/0235569 A1 | 9/2011 | Huang et al. |
| 2011/0312268 A1 | 12/2011 | Wei |
| 2012/0122508 A1 | 5/2012 | Nakayama |
| 2012/0165032 A1 | 6/2012 | Park et al. |
| 2012/0257519 A1* | 10/2012 | Frank ............ H04L 5/143 370/252 |
| 2012/0307770 A1 | 12/2012 | Kubota |
| 2013/0010718 A1 | 1/2013 | Horn |
| 2013/0083749 A1 | 4/2013 | Xu et al. |
| 2013/0136074 A1 | 5/2013 | Okino |
| 2013/0163543 A1 | 6/2013 | Freda et al. |
| 2013/0223402 A1 | 8/2013 | Feng et al. |
| 2014/0071958 A1 | 3/2014 | Toskala et al. |
| 2015/0009910 A1 | 1/2015 | Ryu et al. |
| 2015/0036563 A1* | 2/2015 | Hurd ............ H04W 72/23 370/329 |
| 2015/0296403 A1 | 10/2015 | Guan et al. |
| 2015/0304889 A1 | 10/2015 | Qian et al. |
| 2015/0319741 A1 | 11/2015 | Li et al. |
| 2016/0135170 A1 | 5/2016 | Chen et al. |
| 2018/0049176 A1 | 2/2018 | Park et al. |
| 2018/0287696 A1 | 10/2018 | Barbieri et al. |
| 2019/0037475 A1 | 1/2019 | Zhang et al. |
| 2019/0132753 A1* | 5/2019 | Devarasetty ....... H04B 17/3912 |
| 2019/0150150 A1 | 5/2019 | Calin et al. |
| 2019/0229986 A1 | 7/2019 | Chen et al. |
| 2019/0280845 A1 | 9/2019 | Bedekar |
| 2019/0313279 A1 | 10/2019 | Li et al. |
| 2019/0313412 A1 | 10/2019 | Baldemair et al. |
| 2020/0236515 A1 | 7/2020 | Zevallos |
| 2021/0014739 A1 | 1/2021 | Xin et al. |
| 2021/0045131 A1 | 2/2021 | Vivanco et al. |
| 2021/0051519 A1 | 2/2021 | Bedekar et al. |
| 2021/0084557 A1 | 3/2021 | Song et al. |
| 2021/0266920 A1 | 8/2021 | Yan |

OTHER PUBLICATIONS

U.S. Appl. No. 16/791,451, Notice of Allowance mailed Jul. 22, 2022, 83 pages.

U.S. Appl. No. 16/791,451, Office Action mailed Feb. 25, 2022, 24 pages.

\* cited by examiner

LTE RESOURCE ALLOCATION CONTROLLER

CROSS-REFERENCE TO RELATED APPLICATION

This application is a continuation of U.S. application Ser. No. 16/791,451, filed Feb. 14, 2020, which is incorporated by reference.

BACKGROUND

Internet of Things (IoT) devices use cellular networks to support various applications of Internet of Things. Such communications involve a massive number of devices transmitting small amounts of data, often with different requirements for reliability and availability. For human-to-human communications, congestion within a radio spectrum is based on the number of users submitting communication requests. However, telecommunications services for IoT devices differ in scale and construct. IoT devices typically outnumber subscriber numbers (i.e. human-to-human communications), and IoT devices often transmit varying amounts of data with varying reliability and availability requirements.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 1A illustrates a first computing environment in which the resource allocation controller is communicatively coupled to a control plane within the Evolved Packed Core of the LTE telecommunications network. FIG. 1B illustrates a second computing environment in which the resource allocation controller is communicatively coupled directly to the base station node.

FIG. 2A illustrates a general flow of communications between the resource allocation controller and the base station node. FIG. 2B illustrates an exemplary process for selecting the first resource allocation algorithm, which assigns individual PRBs for data communications of a UE within the LTE spectrum. FIGS. 2C and 2D illustrate exemplary processes for selecting the second resource allocation algorithm that assigns a PRB group for data communications of a UE within the LTE spectrum.

DETAILED DESCRIPTION

Figure 1A:
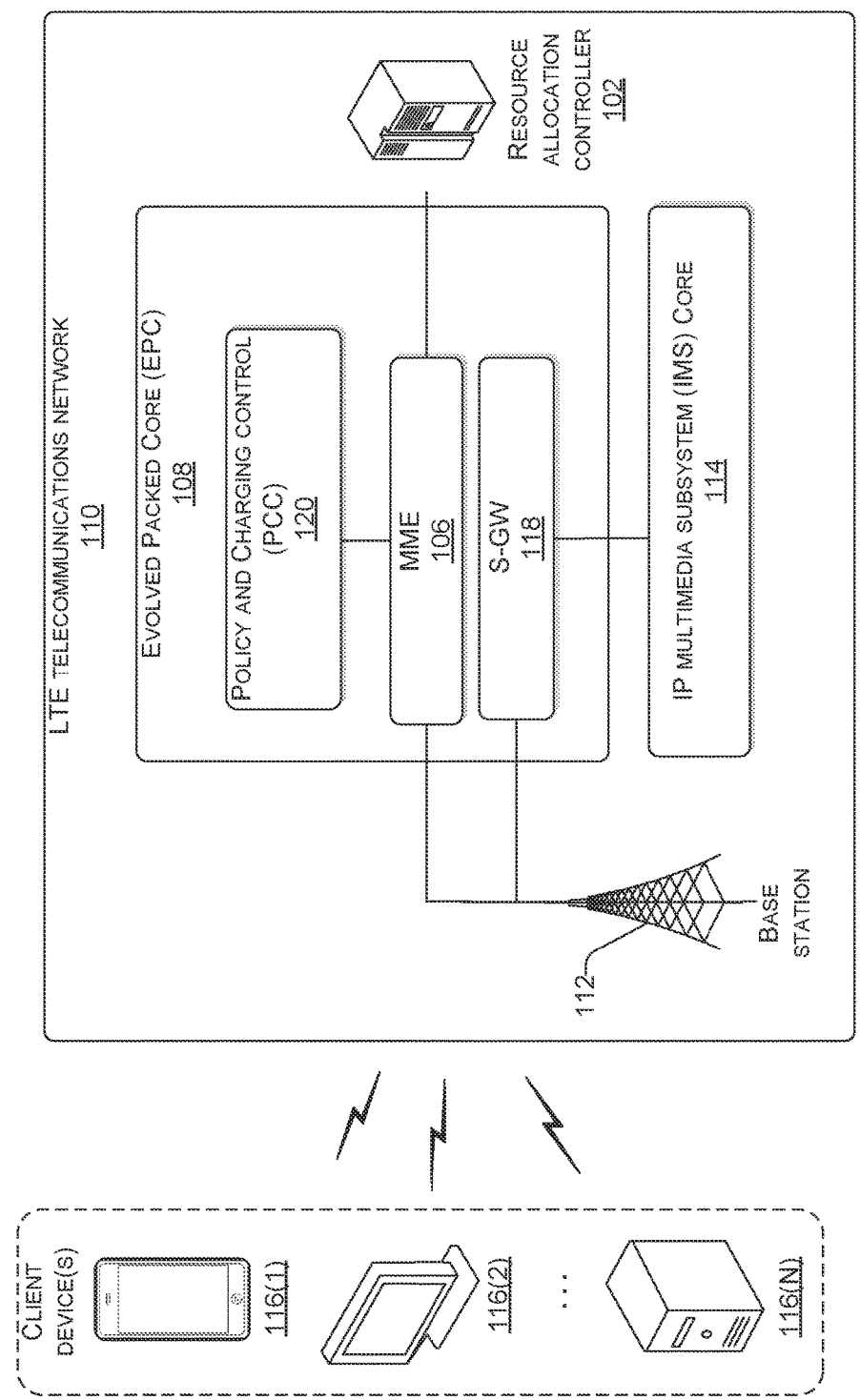
FIGS. 1A and 1B illustrate exemplary computing environments for operations of the resource allocation controller.

This disclosure describes techniques to optimize allocation of physical resource blocks (PRBs) for user equipment (UE), such as Long-Term Evolution (LTE) and Narrow-Band Internet of Things (NB-IoT) devices, within a Long-Term Evolution (LTE) spectrum. Notably, in-band deployment of NB-IoT devices corresponds to a deployment scenario in which service providers deploy NB-IoT devices within an LTE spectrum, using LTE in-band resource blocks (RBs). LTE network traffic typically varies over time and a service provider can benefit from techniques that optimize available physical resources and control resources to accommodate times of network congestion.

Presently, a service provider may make use of at least one of two resource allocation algorithms to allocate physical resources within an LTE spectrum. A first resource allocation algorithm may allocate an exact number of PRBs for data communications of a User Equipment (UE) within the LTE spectrum. By way of example, consider the deployment of an NB-IoT device within the LTE spectrum. The NB-IoT device typically occupies a frequency band of 180 kHz, which corresponds to approximately one PRB in the LTE spectrum. In this example, the first resource allocation algorithm may be used to allocate one PRB for data communications associated with the NB-IoT device.

A benefit of the first resource allocation algorithm is that by assigning an exact, or near-exact number of PRBs needed for data communications of a UE, the service provider lessens the likelihood that PRBs are assigned to a UE and left unused. Unused PRBs are considered a wasted resource, which creates an avoidable inefficiency that may impact data communications of other devices within the LTE spectrum.

However, the corollary of allocating an exact, or near-exact number of PRBs for data communications of a UE is that the number of control channel elements needed to transmit control information associated with each PRB assignment also increases, thereby creating a concurrent inefficiency. In other words, the efficiency created by assigning individual PRBs to individual UEs may be negated by the inefficiency created by the increase in control channel elements needed to convey the assignment of individual PRBs to data communications associated with the UE.

To balance the efficiency/inefficiency dichotomy of the first resource allocation algorithm, service providers may use a second resource allocation algorithm that assigns a PRB group to data communications associated with a UE, rather than assigning an exact or near-exact number of PRBs. The number of PRBs inside a PRB group is based at least in part on the LTE bandwidth. In a non-limiting example, two PRBs may comprise a PRB group for a 5 MHz LTE bandwidth; three PRBs may comprise a PRB group for a 10 MHz LTE bandwidth; four PRBs may comprise a PRB group for a 15 MHz LTE bandwidth; and, four PRBs may comprise a PRB group for a 20 MHz LTE bandwidth. When assigning a PRB group to a data communications associated with a UE, all PRBs within the PRB group are collectively assigned to data communications for the UE.

In order to achieve a higher level of granularity (i.e. assign data communications to PRBs rather than PRB groups), additional Downlink Control Information (DCI) is required for transmission to the UE, which in turn increases the control channel element (CCE) utilization. Accordingly, the number of control resource elements needed to transmit control information for a PRB group assignment is correspondingly less than the number of control resource elements needed to transmit control information for individual PRB assignments. In this way, the second resource allocation algorithm creates an efficiency in the utilization of control resource elements.

However, the corollary of creating an efficiency in the utilization of control resource elements is the subsequent inefficiency in the utilization of PRBs within a PRB group. Returning to the previous example of an LTE and NB-IoT device, since the NB-IoT device typically occupies a frequency band of 180 kHz (i.e. one PRB), an assignment of a PRB group for data communications associated with the NB-IoT device may leave three PRBs within the PRB group unused, assuming that the PRB group comprises four PRBs. In band deployment scenario, An NB-IoT carrier can be installed only at some particular PRB locations, this is to facilitating UE initial synchronization is referred to as an anchor carrier. For in-band deployment, not all frequencies, i.e. resource blocks within the LTE carrier, can be used for NB-IoT cell connection. For the UE to synchronize and acquire the NB-IoT cell, for an in-band downlink anchor carrier, the PRB is restricted to the values set out in Table below. This, in turn, creates an inefficiency in utilization of PRB resources. The unused PRBs within the PRB group are considered a wasted resource and an avoidable inefficiency that may impact data communications of other devices within the LTE spectrum.

Accordingly, this disclosure describes a resource allocation controller that is configured to select one of at least two resource allocation algorithms, namely the first resource allocation algorithm or the second resource allocation algorithm. The selected resource allocation algorithm may be used to allocate physical resources and control resources within an LTE spectrum for carrying data communications associated with a UE. In some examples, the resource allocation controller may select a resource allocation algorithm based on an identity of the UE and an analysis of real-time or near real-time utilization of physical resources and control resources within the LTE spectrum.

For example, the resource allocation controller may detect an NB-IoT device deployed within an LTE spectrum and determine that the NB-IoT device occupies a 180 kHz frequency band, which is equivalent to one PRB. In doing so, the resource allocation controller may analyze the real-time or near real-time physical resource utilization and control resource utilization of the LTE spectrum to determine whether an allocation of one PRB for the NB-IoT device should be governed by the first resource allocation algorithm (i.e. designate one PRB) or the second resource allocation algorithm (i.e. designate one PRB group, of which a number of PRBs within the PRB group may be left unused).

The resource allocation controller monitors physical and control resource allocations at a physical downlink share channel (PDSCH) and a physical downlink control channel (PDCCH) of the LTE spectrum. Within the LTE spectrum, transmissions are organized into radio frames of 10 ms, whereby each frame is divided into ten subframes of 1 ms. Each subframe comprises a PDSCH and a PDCCH. The PDSCH is responsible for carrying data communications in a downlink direction (i.e. base-station node to UE), and the PDCCH is responsible for carrying control information associated with the data communications in the downlink direction.

In various examples, the resource allocation controller may determine that the physical resource utilization of the LTE spectrum, namely PRBs within the PDSCH, is greater than or equal to a predetermined PDSCH threshold. The predetermined PDSCH threshold may reflect a baseline PRB utilization (i.e. a portion of PRBs used within the PDSCH) above which the PDSCH may be considered congested. In another embodiment, additionally or alternately, the predetermined PDSCH threshold may reflect a baseline PRB utilization above which the PDSCH is unable to maintain a predetermined Quality of Service (QoS) for data communications. The predetermined PDSCH threshold may be set by an administrator or operator of the telecommunications network and may further include a hysteresis value (i.e. tolerance) that accounts for anticipated changes in PDSCH utilization due to expected fluctuations in network traffic over a predetermined time interval. In other examples, the predetermined PDSCH threshold, and/or the hysteresis value, may be dynamically set by one or more trained machine-learning algorithms that monitor and correlate QoS associated with data communications and the utilization of PRBs within the PDSCH. QoS may correspond to a quantitative measure of real-time bit-rate, network latency, downlink communications, or network-specific responsiveness of hardware or software elements of the LTE spectrum.

Moreover, in response to determining that the PDSCH utilization is greater than or equal to the predetermined PDSCH threshold, the resource allocation controller may select the first resource allocation algorithm that assigns individual PRBs to data communications associated with the NB-IoT device. In this way, the resource allocation controller may ensure that the remaining PRBs may be assigned to other data communications for other devices, rather than being left unused as part of a PRB group assigned to the NB-IoT device.

Alternatively, in another preferred embodiment, rather than selecting the first resource allocation algorithm based solely on PDSCH utilization, the resource allocation controller may determine whether the control resource utilization of the LTE spectrum, namely within the PDCCH, is greater than or equal to a predetermined PDCCH threshold. The predetermined PDCCH threshold may reflect a baseline number of resource elements used within the PDCCH, above which the PDCCH may be considered congested, or unable to maintain a predetermined QoS for data communications. Similar to the predetermined PDSCH threshold, the predetermined PDCCH threshold may be set by an administrator or operator of the telecommunications network and further include a hysteresis value (i.e. tolerance value) that accounts for anticipated changes in PDCCH utilization that occur with expected fluctuations in network traffic over a predetermined time interval. In other examples, the predetermined PDCCH threshold, and/or hysteresis value may be dynamically set by one or more trained machine-learning algorithms that monitor and correlate QoS associated with data communications and the utilization of Control Channel Elements (CCE) within the PDCCH. It is noteworthy that the hysteresis value associated with the predetermined PDCCH threshold may the same as the hysteresis value associated with the predetermined PDSCH threshold. Alternatively, the two hysteresis values (i.e. predetermined PDSCH and PDCCH thresholds) may be different and based on independent calculations.

The resource allocation controller may determine that the utilization of CCE utilization within the PDCCH is greater than or equal to the predetermined PDCCH threshold, and further select the second resource allocation algorithm to assign individual PRB groups for data communications of a UE. In this example, a relatively high control resource utilization within the PDCCH (i.e. greater than or equal to the predetermined PDCCH threshold) may negate any efficiency derived within the PDSCH from assigning individual PRBs to carry data communications associated with a UE (i.e. first resource allocation algorithm).

Alternatively, the resource allocation controller may determine that the PDCCH utilization is less than the predetermined PDCCH threshold, and further select the first resource allocation algorithm to assign individual PRBs for data communications of the UE. In this example, the resource allocation controller may infer that a relatively low PDCCH utilization (i.e. PDCCH utilization less than predetermined PDCCH threshold) may carry additional control information (i.e. DCI messages) without causing congestion or compromising a predetermined QoS.

While this disclosure describes techniques intended for optimizing resource allocation for an NB-IoT device deployed within an LTE spectrum, further variations and modifications can be made such that the resource allocation controller may optimize resource allocation for other UE that occupy frequency bands greater than or equal to 180 kHz, which is typically associated with an NB-IoT device. For example, the resource allocation controller may detect a UE deployed within the LTE spectrum, determine the frequency band occupied by the UE, and identify an exact or near-exact number of PRBs for data communications within the LTE spectrum. In doing so, the resource allocation controller may select one of the first resource allocation algorithm or the second resource allocation algorithm based at least in part on the relative utilization of the PDSCH and PDCCH and the exact or near-exact number of PRBs associated with the UE.

Further, the term "techniques," as used herein, may refer to system(s), method(s), computer-readable instruction(s), module(s), algorithms, hardware logic, and/or operation(s) as permitted by the context described above and through the document.

Figure 1B:
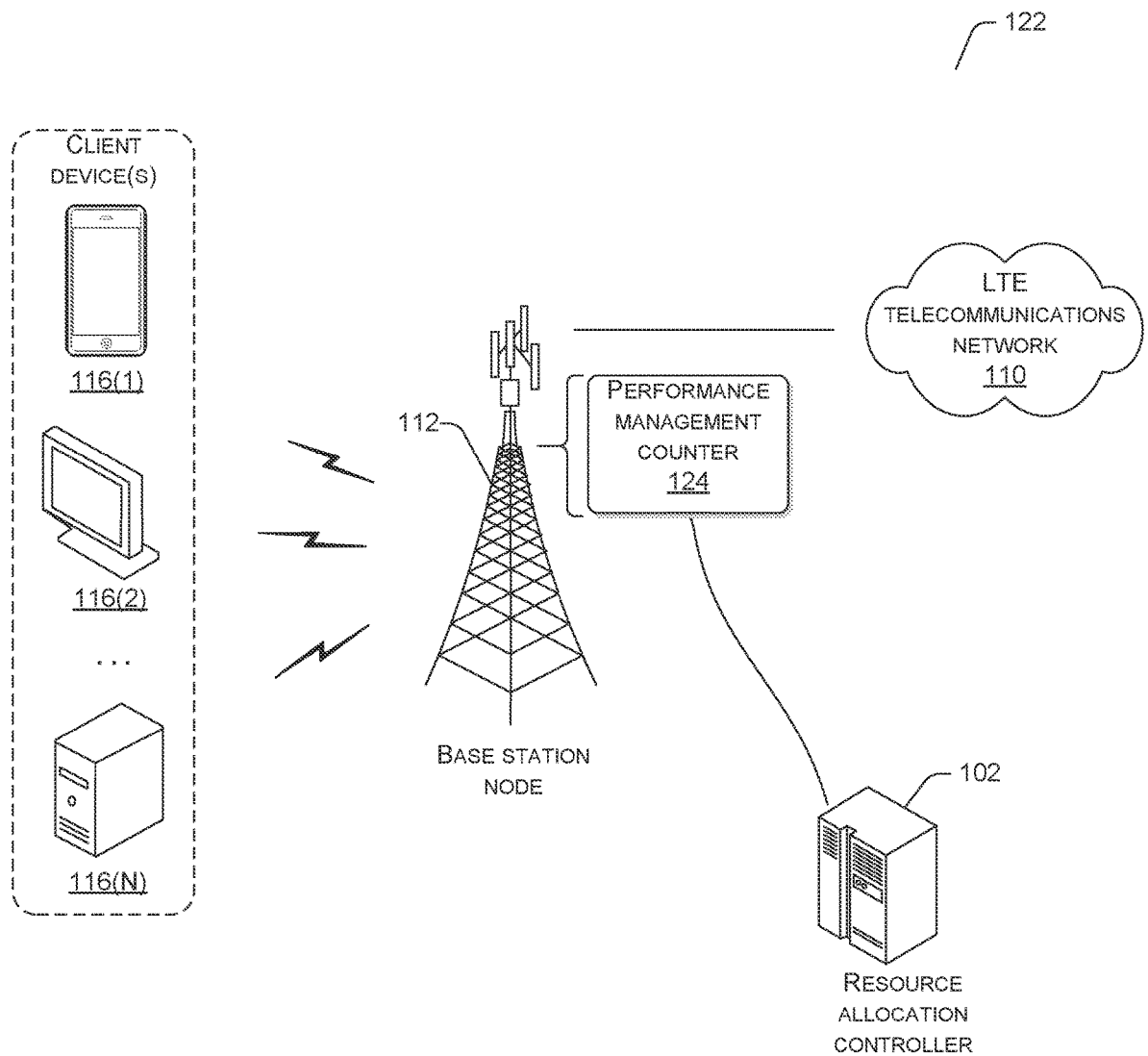

FIGS. 1A and 1B illustrate exemplary computing environments for operations of the resource allocation controller 102. FIG. 1A illustrates a first computing environment 104 in which the resource allocation controller 102 is communicatively coupled to a Mobility Management Entity (MME) 106 within an Evolved Packed Core (EPC) 108 of an LTE telecommunications network 110.

The LTE telecommunications network 110 may correspond to a Long-Term Evolution (LTE) network. The first computing environment 104 may include a base station node 112 and an EPC 108 and an Internet Protocol (IP) Multimedia Subsystem (IMS) core 114. The base station node 112 is responsible for handling voice and data traffic via air interfaces between the EPC 108 and client device(s) 116(1)-116(N). The EPC 108 may provide telecommunication and data communication services to multiple client devices, such as an LTE-compatible client device, collectively referred to as client device(s) 116(1)-116(N).

The EPC 108 may further include a Serving Gateway (S-GW) 118, an MME 106, and a Policy and Charging Control (PCC) 120. The S-GW 118 may be configured to deal with user plane traffic and route and forward user plane related information to other networks, such as the IMS core 114. The MME 106 is configured to deal with control plane data, such as PDSCH utilization and PDCCH utilization. More specifically, the MME 106 performs signal functions in the EPC 108, such as sending and receiving signal information needed to set up and address communications with the base station node 112, while also including security protocols for authentication and authorization of client device(s) 116(1)-116(N).

In the illustrated example, the PCC 120 may enable detection of communication service data flow and provide parameters for policy control and/or charging control. Further, the IMS core 114 is responsible for handling (routing) Session Initiation Protocol (SIP) traffic.

The client device(s) 116(1)-116(N) may include any sort of electronic device, such as a cellular phone, a smartphone, a tablet computer, an electronic reader, a media player, a gaming device, a personal computer (PC), a laptop computer, etc. The client device(s) 116(1)-116(N) may include a subscriber identity module (SIM), such as an eSIM, to identify the client device(s) 116(1)-116(N) to a telecommunications service provider network (also referred to herein, as "telecommunications network").

Further, the resource allocation controller 102 may operate on one or more distributed computing resource(s). The one or more distributed computing resource(s) may include one or more computing device(s) that operate in a cluster or other configuration to share resources, balance load, increase performance, provide fail-over support or redundancy, or for other purposes. The one or more computing device(s) may include one or more interface(s)

FIG. 1B illustrates a second computing environment 122 in which the resource allocation controller 102 is communicatively coupled directly to the base station node 112 within an LTE telecommunications network 110. The second computing environment 122 described with reference to FIG. 1B includes various details that were previously described with reference to FIG. 1A, and which relate to the resource allocation controller 102. As such, for brevity and ease of description, such details have been omitted herein to the extent that the same or similar details have been provided in FIG. 1A.

Referring to FIG. 1B, the resource allocation controller 102 may be communicatively coupled directly to the base station node 112, such that the monitoring activity occurs in real-time, or near real-time. The base station node 112 may be communicatively coupled to a performance management (PM) counter 124 that resides at the base station node 112. In this example, the PM counter 124 may be tasked with monitoring utilization of the PDSCH and PDCCH in real-time or near real-time, and accordingly, transmit monitored data to the resource allocation controller 102 at predetermined time intervals.

Figure 2A:
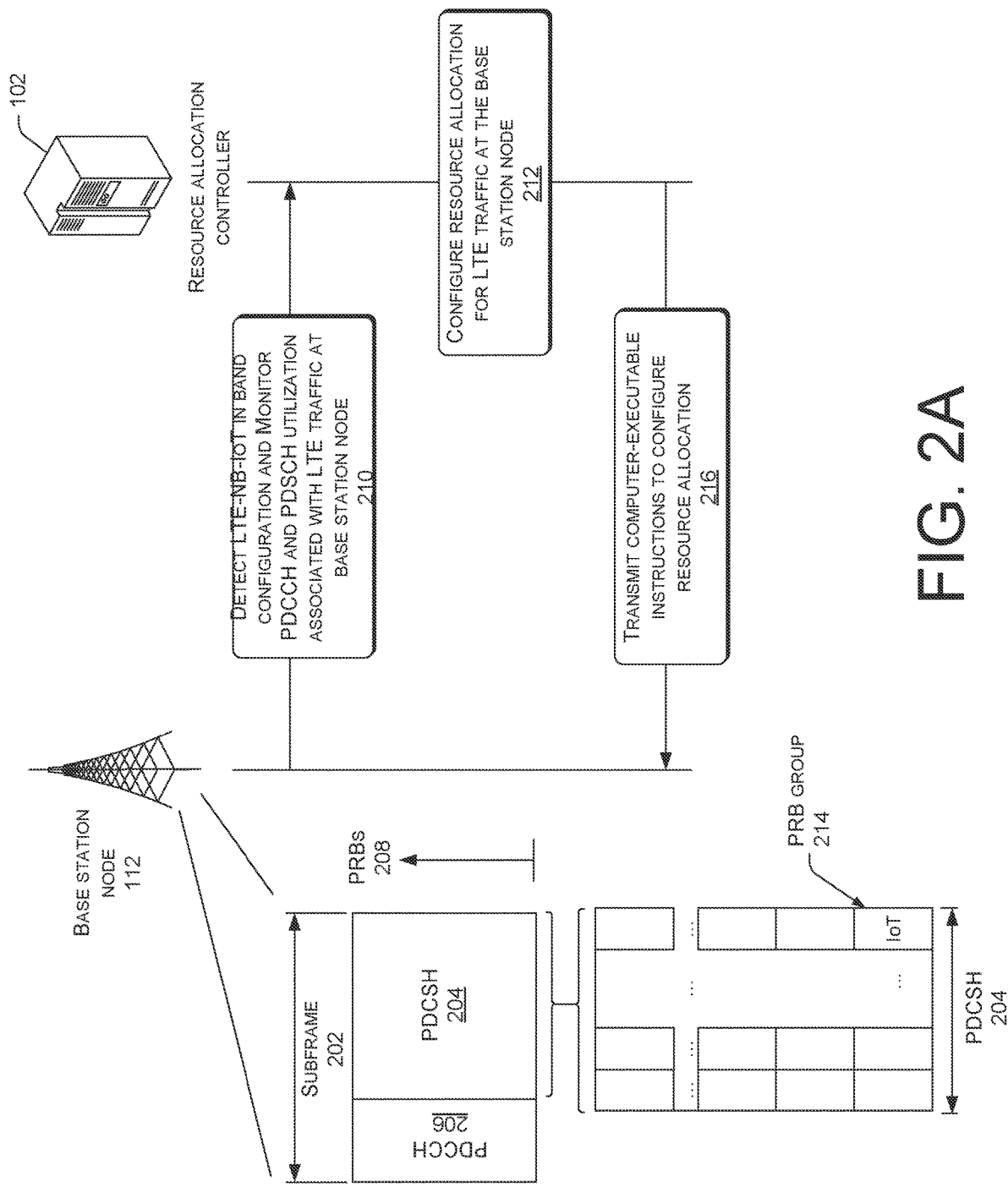
FIGS. 2A through 2D illustrate block diagrams of a resource allocation controller process for selecting a resource allocation algorithm.
Figure 2B:
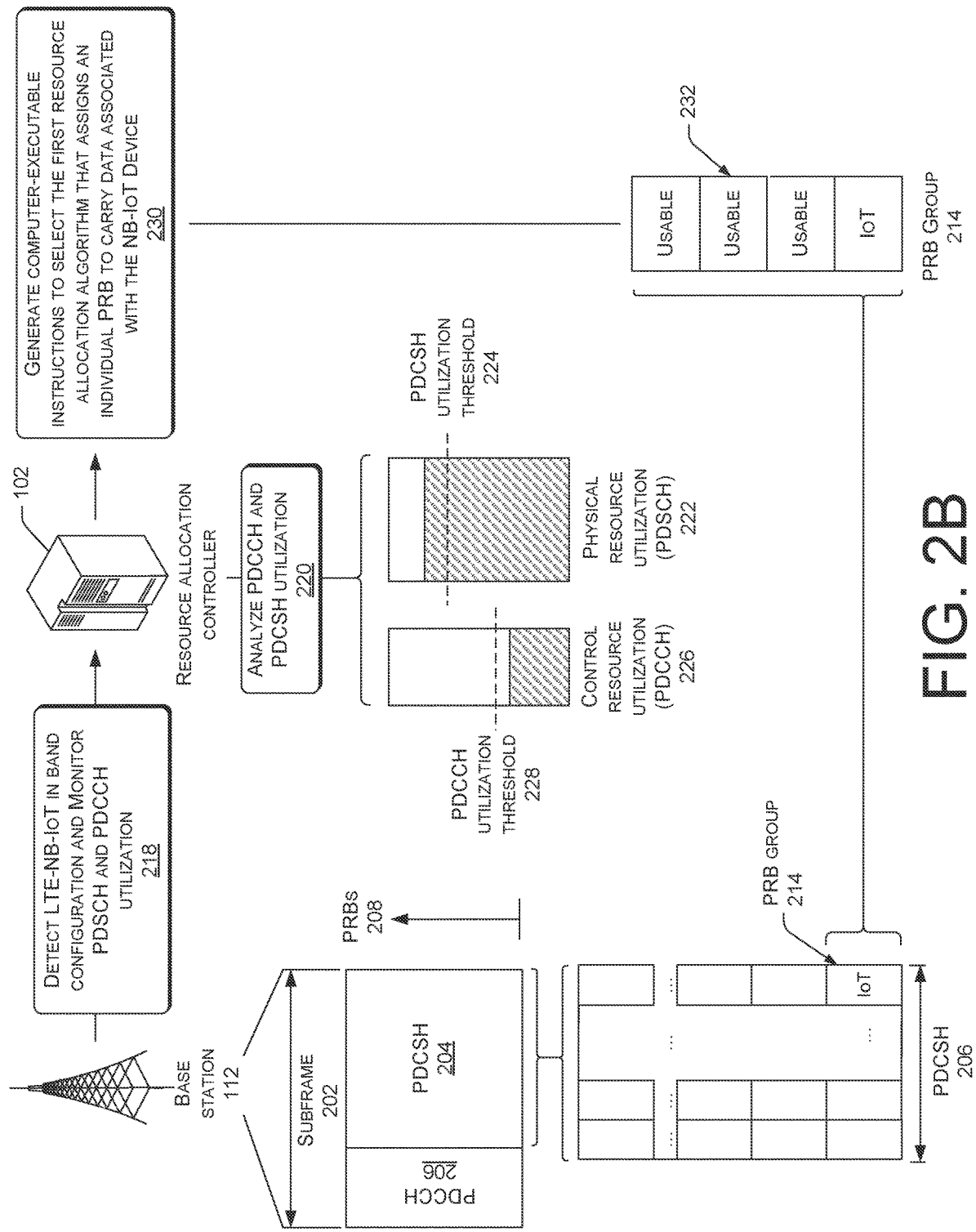
Figure 2C:
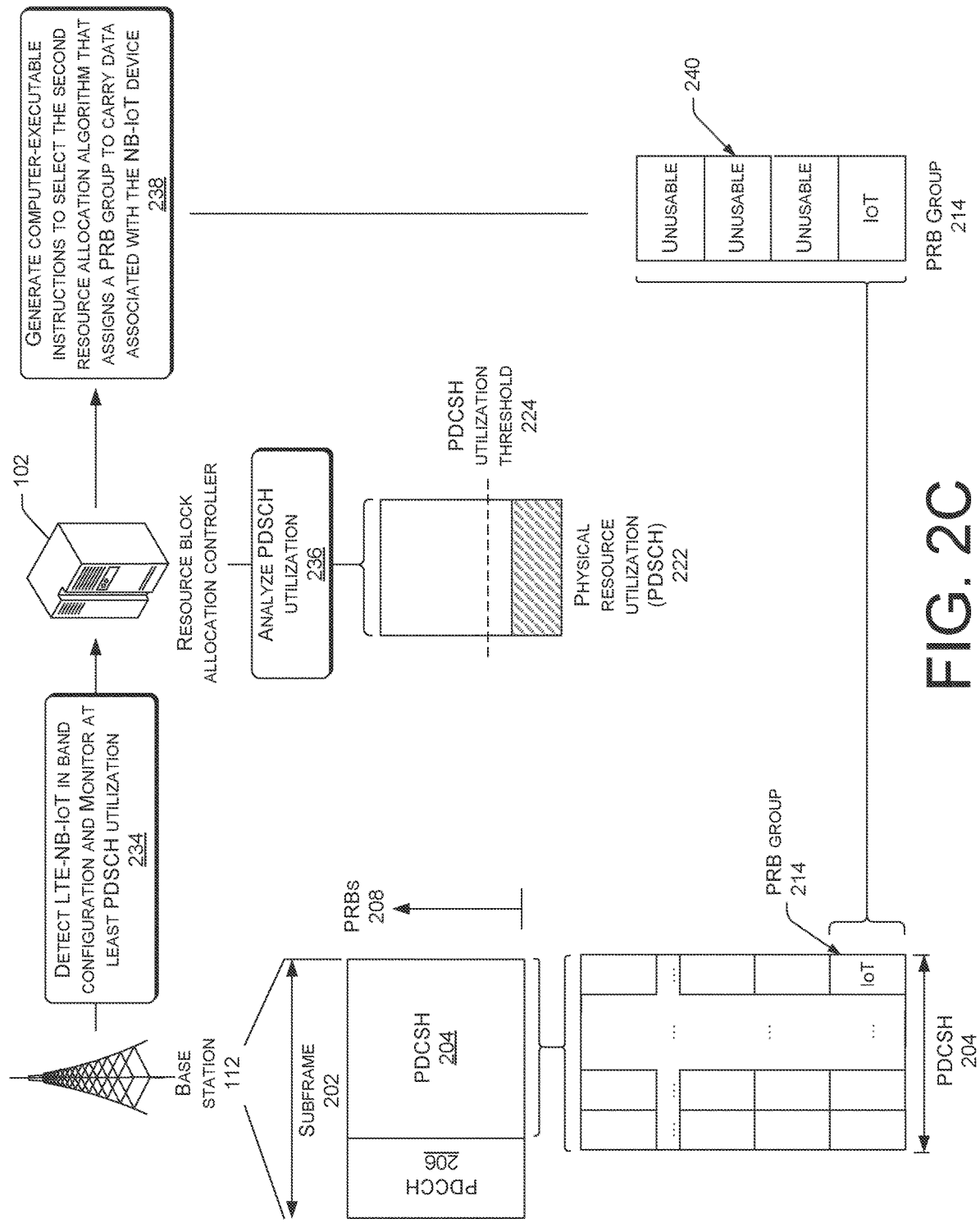
Figure 2D:
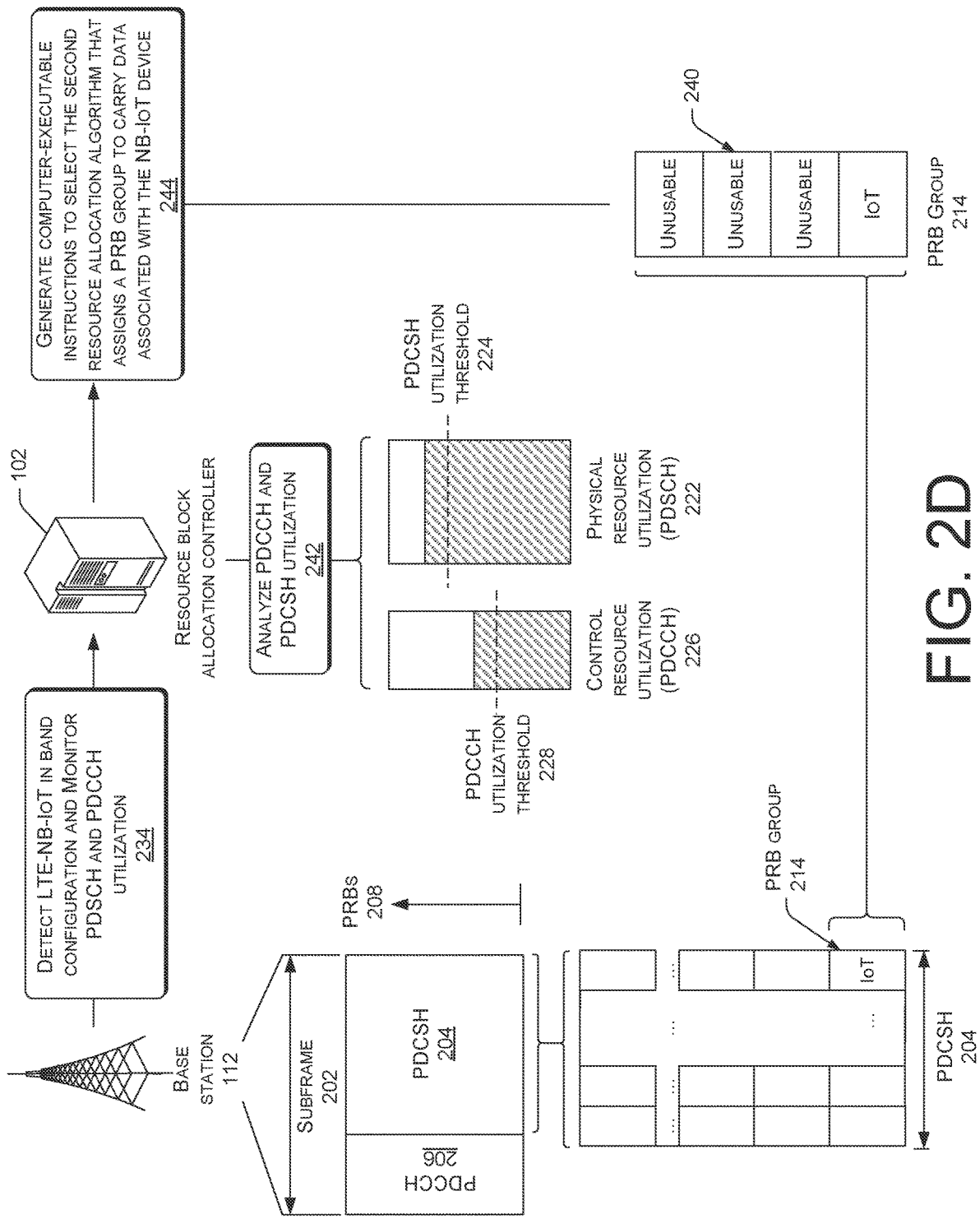

FIGS. 2A through 2D illustrate block diagrams of a resource allocation controller process for selecting a resource allocation algorithm. FIG. 2A illustrates a general flow of communications between the resource allocation controller 102 and a base station node 112. FIG. 2B illustrates an exemplary process for selecting the first resource allocation algorithm, which assigns individual PRBs for data communications of a UE within the LTE spectrum. FIGS. 2C and 2D illustrate exemplary processes for selecting the second resource allocation algorithm that assigns a PRB group for data communications of a UE within the LTE spectrum. The UE may correspond to one of the client device(s) 116(1)-116(N).

Transmissions within the LTE spectrum are organized into radio frames of 10 ms, whereby each frame is divided into ten subframes of 1 ms. In the downlink channel, transmissions are multiplexed using Orthogonal Frequency Division Multiple Access (OFDMA). Each subframe 202 comprises a PDSCH 204 and a PDCCH 206. The PDCCH 206 occupies up to the first three OFDM symbols in a subframe 202. A symbol refers to a pulse (i.e. waveform) in digital baseband transmission that persists for a fixed period of time. The PDSCH 204 occupies the remaining symbols in the subframe 202. By way of comparison, a physical resource block (PRB) occupies seven symbols.

On the PDSCH 204, data is sent in a downlink direction. The PDSCH 204 comprises PRBs 208 that may be assigned to carry a data communication associated with a UE. Each PRB is 180 kHz wide in frequency and 0.5 ms (i.e. one slot) long in time. The minimum amount of resources that the base station node 112 can allocate to a UE is 180 kHz wide in frequency (i.e. one PRB) and 1 ms in time domain. 1 ms is the transmission time interval (TTI) of the LTE spectrum.

Referring now to the PDCCH 206, the PDCCH 206 is configured to carry control packets associated with a data communication sent via the PDSCH 204 in the downlink direction. Control packets on the PDCCH 206 carry resource allocation information associated with the data communication. Resource allocation information is transmitted using Downlink Control Information (DCI) messages, which are control messages carried by the PDCCH 206. These messages can be meant for a user equipment (UE) or a group of user equipment (UEs). DCI messages are used by the base station node 112 to indicate which PRBs 208 that a UE has been granted to use and the modulation and code scheme that is to be used for transmission.

Referring to FIG. 2A, the resource allocation controller 102 may interact with a base station node 112 to monitor utilization of the PDSCH 204 and PDCCH 206 of a subframe 202 within the LTE spectrum. Specifically, at block 210, the resource allocation controller 102 may monitor DCI messages within the PDCCH 206 and detect transmission of a data communication associated with a UE (i.e. LTE-NB-IoT in band configuration). The resource allocation controller 102 may further identify the device type of the UE (i.e. NB-IoT device).

Also, at block 210, the resource allocation controller 102 may monitor each of the PDSCH 204 and PDCCH 206 to determine a level of real-time or near real-time PDSCH and PDCCH utilization. PDSCH utilization (i.e. physical resource utilization) may be determined as the number of PRBs 208 within the PDSCH 204 of the subframe 202 that have been assigned to carry data communications for UEs relative to the total number PRBs 208 within the PDSCH 204 of the subframe 202. PDCCH utilization (i.e. control resource utilization) may be determined as the number of control channel elements (CCE) assigned to carry DCI messages for data communications carried within the PDSCH, relative to the total number of CCE within the PDCCH 206 of the subframe 202.

Referring now to block 212, in response to monitoring the PDSCH 204 and PDCCH utilization within the subframe 202, the resource allocation controller 102 may determine whether to select one of at least two resource allocation algorithms, namely a first resource allocation algorithm or a second resource allocation algorithm. The first resource allocation algorithm may be configured to assign an exact or near-exact number of PRBs to data communications for the UE. In contrast, the second resource allocation algorithm may be configured to assign a PRB group 214, rather than an exact or near-exact number of PRBs. Each PRB group 214 may comprise at least four PRBs, which are collectively assigned to data communications for the UE.

At block 216, in response to determining a selection of a resource allocation algorithm, the resource allocation controller 102 may generate a set of computer-executable instructions that select a resource allocation algorithm to assign PRBs or a PRB group 214 to the UE. In doing so, the resource allocation controller 102 may transmit the set of computer-executable instructions to a packet scheduler at the base station node 112. Upon receipt, the packet scheduler may schedule data communications of the UE within the PDSCH 204 and PDCCH 206, pursuant to the selected resource allocation algorithm.

In various examples, the set of computer-executable instructions may further include signal data for delivery to the UE, via the base station node, that assigns a resource allocation of PRBs or a PRB group 214 to the UE, based at least in part on the selected resource allocation algorithm.

FIG. 2B illustrates an exemplary process for selecting the first resource allocation algorithm, which assigns individual PRBs for data communications of a UE within the LTE spectrum. The process flow described in FIG. 2B includes various details that were previously described with reference to FIG. 2A, and which relates to the resource allocation controller 102 and its selection of a resource allocation algorithm. As such, for brevity and ease of description, such details have been omitted herein to the extent that the same or similar details have been provided in FIG. 2A.

Referring to FIG. 2B, at block 218, the resource allocation controller 102 may detect a data communication associated with an LTE-NB-IoT in band configuration device deployed within the LTE spectrum. Specifically, the resource allocation controller 102 may identify the NB-IoT device based on a related DCI message within the PDCCH 206. In doing so, the resource allocation controller 102 may determine the number of PRBs to assign for data communications of the NB-IoT device, based at least in part on the occupied frequency band. By way of example, the NB-IoT device may occupy a frequency band of 180 kHz, which corresponds to one PRB.

At block 220, the resource allocation controller 102 may analyze the utilization of the PDSCH 204 (i.e. physical resource utilization) and PDCCH 206 (i.e. control resource utilization) of a subframe 202 within the LTE spectrum. In the illustrated example of FIG. 2B, analysis of physical resource utilization 222 (i.e. PDSCH 204) may indicate that the number of PRBs assigned to carry data communications for UEs, including the NB-IoT device is greater than a predetermined PDSCH threshold 224. The predetermined PDSCH threshold 224 may reflect a baseline PRB utilization (i.e. the number of PRBs carrying data communications within the PDSCH 204) above which the PDSCH 204 may be considered congested, or unable to maintain a predetermined Quality of Service (QoS) for data communications. In this example, the resource allocation controller 102 may infer that the PDSCH 204 is congested.

The resource allocation controller 102 may further analyze control resource utilization 226 (i.e. PDCCH 206) to determine that the number of CCE assigned to carry control information (DCI messages) is less than a predetermined PDCCH threshold 228. The predetermined PDCCH threshold 228 may reflect a baseline number of CCE used within the PDCCH 206, above which the PDCCH 206 may be considered congested, or unable to maintain a predetermined QoS for data communications. In this example, the resource allocation controller 102 may infer that the PDCCH 206 may carry additional control information (i.e. DCI messages) without causing congestion or compromising a predetermined QoS.

Therefore, in block 230, the resource allocation controller 102 may generate a set of computer-executable instructions that select the first allocation algorithm, which is configured to assign an individual PRB to data communications of the NB-IoT device. Since in this example, the NB-IoT device need only occupy one PRB, the selection of the first allocation algorithm permits remaining PRBs to be usable 232 for data communications of other UE devices. In the illustrated example of FIG. 2B, three PRBs within a PRB group 214 of four PRBs remain usable 232 for data communications of other UE devices.

FIG. 2C illustrates an exemplary process for selecting the second resource allocation algorithm, which assigns a PRB group 214 for data communications of a UE within the LTE spectrum. The process flow described in FIG. 2C includes various details that were previously described with reference to FIGS. 2A and 2B, and which relate to the resource allocation controller 102 and its selection of a resource allocation algorithm. As such, for brevity and ease of description, such details have been omitted herein to the extent that the same or similar details have been provided in FIGS. 2A and 2B.

Referring to FIG. 2C, at block 234, the resource allocation controller 102 may detect a data communication associated with an LTE-NB-IoT in band configuration device deployed within the LTE spectrum and further determine the number of PRBs to assign for data communications of the NB-IoT device. In the illustrated example, a block 236, the resource allocation controller 102 may analyze the utilization of the PDSCH 204 (i.e. physical resource utilization) of a subframe 202 within the LTE spectrum and determine that the number of PRBs assigned to carry data communications for UEs within the PDSCH 204 is less than the predetermined PDSCH threshold 224. In doing so, the resource allocation controller 102 may infer that the current utilization of PRBs within the PDSCH 204 does not adversely impact a QoS of data communications within the LTE spectrum.

Accordingly, at block 238, the resource allocation controller 102 may generate a set of computer-executable instructions that select the second resource allocation algorithm to assign PRB groups for data communications of UEs. While the second resource allocation algorithm may cause PRBs within a PRB group 214 to be left unusable 240, the fact that the PDSCH utilization is below the predetermined PDSCH threshold 224 indicates that the presence of unused PRBs within the PRB group 214 is unlikely to adversely impact a QoS of data communications for other UE devices within the LTE spectrum.

FIG. 2D illustrates an additional exemplary process for selecting the second resource allocation algorithm, which assigns a PRB group 214 for data communications of a UE within the LTE spectrum. The process flow described in FIG. 2D includes various details previously described with reference to FIGS. 2A, 2B, and 2C, and which relate to the resource allocation controller 102 and its selection of a resource allocation algorithm. As such, for brevity and ease of description, such details have been omitted herein to the extent that the same or similar details have been provided in FIGS. 2A, 2B, and 2C.

Referring to FIG. 2D, at block 242, the resource allocation controller 102 may analyze the utilization of the PDSCH 204 (i.e. physical resource utilization) and the PDCCH 206 (i.e. control resource utilization) relative to their respective thresholds (i.e. predetermined PDSCH threshold 224 and predetermined PDCCH threshold 228).

In the illustrated example, the resource allocation controller 102 may determine that the utilization of the PDSCH 204 is greater than the predetermined PDSCH threshold 224, and the utilization of the PDCCH 206 is greater than the predetermined PDCCH threshold 228. In this instance, the resource allocation controller 102 may infer that the utilization of CCE within the PDCCH 206 is relatively high, and any further increase may negate any efficiency derived within the PDSCH 204 from assigning individual PRBs to carry data communications associated with the NB-IoT device (i.e. first resource allocation algorithm).

Accordingly, at block 244, the resource allocation controller 102 may generate a set of computer-executable instructions that select the second resource allocation algorithm to assign PRB groups to data communications associated with the NB-IoT device.

Figure 3:
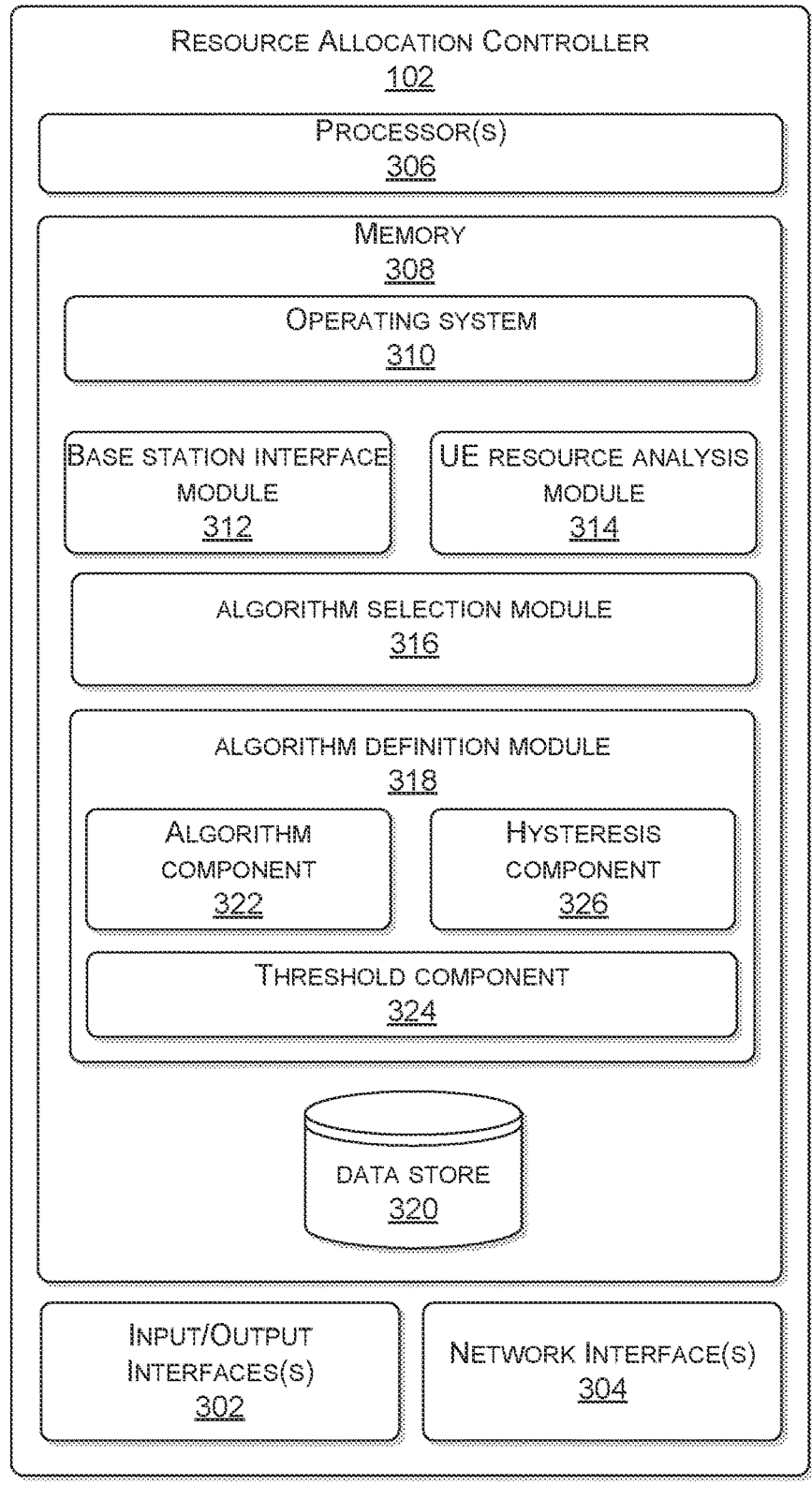
FIG. 3 illustrates a block diagram of various components of the resource allocation controller.

FIG. 3 illustrates a block diagram of various components of the resource allocation controller 102. The resource allocation controller 102 may include input/output interface(s) 302. The input/output interface(s) 302 may include any type of output interface known in the art, such as a display (e.g. a liquid crystal display), speakers, a vibrating mechanism, or a tactile feedback mechanism. Input/output interface(s) 302 also include ports for one or more peripheral devices, such as headphones, peripheral speakers, or a peripheral display. Further, the input/output interface(s) 302 may further include a camera, a microphone, a keyboard/keypad, or a touch-sensitive display. A keyboard/keypad may be a push-button numerical dialing pad (such as on a typical telecommunications device), a multi-key keyboard (such as a conventional QWERTY keyboard), or one or more other types of keys or buttons, and may also include a joystick-like controller and/or designated navigation buttons, or the like.

Additionally, the resource allocation controller 102 may include network interface(s) 304. The network interface(s) 304 may include any sort of transceiver known in the art. For example, the network interface(s) 304 may include a radio transceiver that performs the function of transmitting and receiving radio frequency communications via an antenna. In addition, the network interface(s) 304 may also include a wireless communication transceiver and a near-field antenna for communicating over unlicensed wireless Internet Protocol (IP) networks, such as local wireless data networks and personal area networks (e.g. Bluetooth or near field communication (NFC) networks). Further, the network interface(s) 304 may include wired communication components, such as an Ethernet port or a Universal Serial Bus (USB).

Further, the resource allocation controller 102 may include one or more processor(s) 306 that are operably connected to memory 308. In at least one example, the one or more processor(s) 306 may be a central processing unit(s) (CPU), graphics processing unit(s) (GPU), or both a CPU and GPU or any other sort of processing unit(s). Each of the one or more processor(s) 306 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The one or more processor(s) 306 may also be responsible for executing all computer applications stored in the memory, which can be associated with common types of volatile (RAM) and/or non-volatile (ROM) memory.

In some examples, memory 308 may include system memory, which may be volatile (such as RAM), non-volatile (such as ROM, flash memory, etc.) or some combination of the two. The memory may also include additional data storage devices (removable and/or non-removable) such as, for example, magnetic disks, optical disks, or tape.

The memory 308 may further include non-transitory computer-readable media, such as volatile and nonvolatile, removable and non-removable media implemented in any method or technology for storage of information, such as computer-readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information.

In the illustrated example, the memory 308 may include an operating system 310, a base station interface module 312, a UE resource analysis module 314, an algorithm selection module 316, an algorithm definition module 318, and a data store 320. The operating system 310 may be any operating system capable of managing computer hardware and software resources. The operating system 310 may include an interface layer that enables applications to interface with the input/output interface(s) 302 and the network interface(s) 304.

The base station interface module 312 may be configured to interface with a base station node to monitor physical and control utilization within the LTE spectrum. In one example, the base station interface module 312 may be communicatively coupled directly to the base station node, and thus monitor physical and control utilization resources in real-time. In another example, the base station interface module 312 may be communicatively connected to a performance management counter that resides at the base station node. In this example, the physical and control utilization may be monitored in near real-time at predetermined time intervals, such as one second, five seconds, 30 seconds, one minute, and so forth.

The UE resource analysis module 314 may interact with the base station interface module 312 to receive PDSCH utilization (i.e. physical resource utilization) and PDCCH utilization (i.e. control resource utilization) associated with UEs within a subframe of the LTE spectrum. In doing so, the UE resource analysis module 314 may determine a PDSCH utilization as the number of PRBs within the PDSCH of the subframe that have been assigned to carry data communications relative to the total number of PRBs within the PDSCH of the subframe. Similarly, PDCCH utilization may be determined as the number of CCE assigned to carry control information (i.e. DCI messages) for data communications carried within the PDSCH, relative to the total number of CCE within the PDCCH of the subframe.

Further, the UE resource analysis module 314 may detect transmission of a data communications associated with a UE, identify the device type of the UE (i.e. NB-IoT device), and further determine the number PRBs required for data communication of the UE within the LTE spectrum. By way of example, an NB-IoT device that occupies a frequency band of 180 kHz need only occupy one PRB for data communications within the LTE spectrum.

The algorithm selection module 316 may be configured to interact with the UE resource analysis module 314 to receive the PDSCH utilization and the PDCCH utilization of a subframe, and further analyze each utilization relative to their respective thresholds. For example, the PDSCH utilization may be compared with a predetermined PDSCH threshold, which reflects a baseline PRB utilization (i.e. the portion of PRBs used within the PDSCH) above which the PDSCH may be considered congested, or unable to maintain a predetermined QoS for data communications. Similarly, the PDCCH utilization may be compared with a predetermined PDCCH threshold, which reflects a baseline resource element utilization (i.e. portion of CCE used within the PDCCH) above which the PDCCH may be considered congested, or unable to maintain a predetermined QoS for data communications.

In response to the PDSCH utilization being less than the predetermined PDSCH threshold, the algorithm selection module 316 may select the second resource allocation algorithm, which assigns a PRB group for data communications of the UE within the LTE spectrum.

Further, in response to the PDSCH utilization being greater than or equal to the predetermined PDSCH threshold and the PDCCH utilization being less than the predetermined PDCCH threshold, the algorithm selection module 316 may select the first resource allocation algorithm, which assigns individual PRBs for data communications of the UE within the LTE spectrum. In the case of an NB-IoT device, the algorithm selection module 316 may assign one PRB (i.e. 180 kHz band).

Additionally, in response to the PDSCH utilization being greater than or equal to the predetermined PDSCH threshold and the PDCCH utilization being greater than or equal to the predetermined PDCCH threshold, the algorithm selection module 316 may select the second resource allocation algorithm.

The algorithm definition module 318 may further include an algorithm component 322, a threshold component 324, and a hysteresis component 326. The algorithm component 322 may include a definition of at least the first allocation algorithm and the second resource allocation algorithm. The first resource allocation algorithm may assign individual PRBs for data communications of a UE within the LTE spectrum. The second resource allocation algorithm may assign a PRB group for data communications of a UE within the LTE spectrum. The PRB group may comprise at least four PRBs, which are collectively assigned to a data communication of the UE.

The threshold component 324 may be configured to define the predetermined PDSCH threshold, and the PDCCH threshold used by the algorithm selection module, to select one of the first resource allocation algorithm or the second resource allocation algorithm. The predetermined PDSCH threshold may be set by an administrator or operator of the telecommunications network and may further include a hysteresis value (i.e. tolerance) that accounts for anticipated changes in PDSCH utilization due to expected fluctuations in network traffic over a predetermined time interval.

Similarly, the PDCCH threshold may be set by an administrator or operator of the telecommunications network and may further include a hysteresis value (i.e. tolerance) that accounts for anticipated changes in PDCCH utilization due to expected fluctuations in network traffic over a predetermined time interval.

In some examples, the predetermined PDSCH threshold and the PDCCH threshold may be set dynamically, in real-time, by one or more trained machine-learning algorithms that monitor and correlate QoS associated with data communications and the utilization of PRBs within the PDSCH and CCE within the PDCCH.

For example, the threshold component 324 may retrieve historical instances of PDSCH utilization and PDCCH utilization associated with the LTE spectrum over a predetermined time interval and correlate each instance of utilization with changes in QoS. The QoS data may be retrieved from the UE device, base station node or IMS core of the telecommunications network and may correspond to a quantitative measure of real-time bit-rate, network latency, downlink communications, or network-specific responsiveness of hardware or software elements of the LTE spectrum. In doing so, the threshold component 324 may use one or more trained machine learning algorithms to correlate current PDSCH and PDCCH utilization with historical instances of the same, to infer a predetermined PDSCH threshold and/or a predetermined PDCCH threshold that maintains a requisite QoS. The requisite QoS may be a parameter set by an administrator or operator of the telecommunications network.

The one or more machine learning algorithms may include but are not limited to algorithms such as supervised learning, unsupervised learning, semi-supervised learning, naive Bayes, Bayesian networks decision trees, neural networks, fuzzy logic models, multiclass decision forest, and/or probabilistic classification.

The hysteresis component 326 may be configured to generate a hysteresis value for each of the predetermined PDSCH threshold and the predetermined PDCCH threshold. The hysteresis value may act as a tolerance to each respective threshold that accounts for anticipates changes in PDSCH and PDCCH utilization that occur with expected fluctuations in network traffic. In other words, the hysteresis value ensures that a sudden and momentary peak in PDSCH utilization or PDCCH utilization does not unnecessarily cause a change in algorithm selection (i.e. first or second resource allocation algorithm).

The hysteresis value may be set by an administrator or operator of the telecommunications network. Alternatively, the hysteresis value may be set dynamically, in real-time, by one or more trained machine-learning algorithms that monitor changes in PDSCH and PDCCH utilization over discrete increments of time. In this example, the hysteresis component 326 may retrieve historical instances of PDSCH utilization and PDCCH utilization associated with the LTE spectrum over a predetermined time interval. In doing so, the hysteresis component 326 may use one or more trained machine-learning algorithms to correlate current PDSCH and PDCCH utilization with the historical instances of the same, to infer a hysteresis value.

It is noteworthy that the hysteresis value associated with the predetermined PDCCH threshold may the same as the hysteresis value associated with the predetermined PDSCH threshold. Alternatively, the two hysteresis values (i.e. predetermined PDSCH and PDCCH thresholds) may be different and based on independent calculations.

The data store 320 may include data records of historical instances of PDSCH utilization and PDCCH utilization over a predetermined time interval. Further, the data store 320 may include historical instances of QoS data over the same predetermined time interval.

Figure 4:
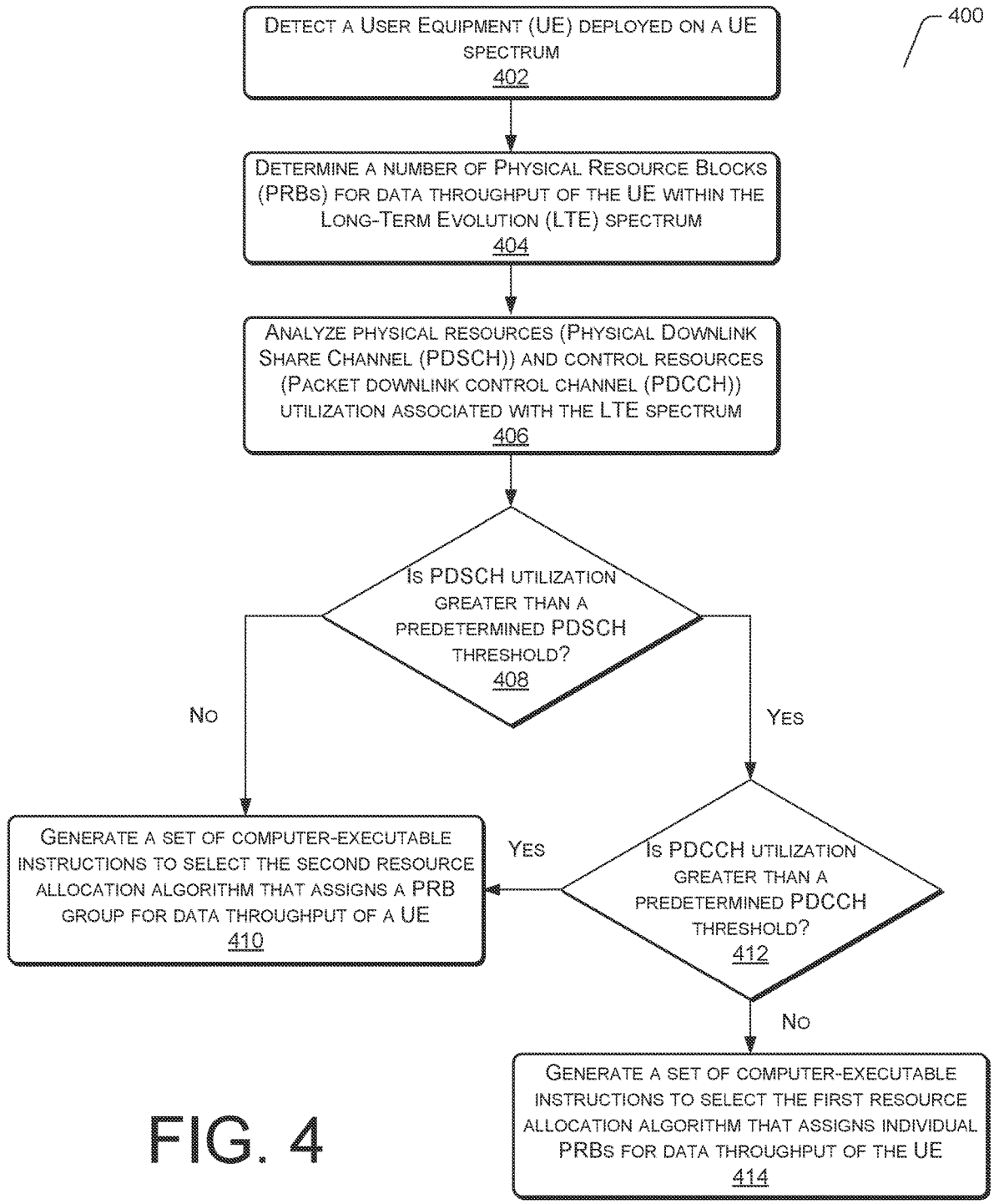
FIG. 4 illustrates a process for detecting a UE deployed on an LTE spectrum and selecting one of at least two resource allocation algorithms for assigning physical resources within the LTE spectrum.
Figure 5:
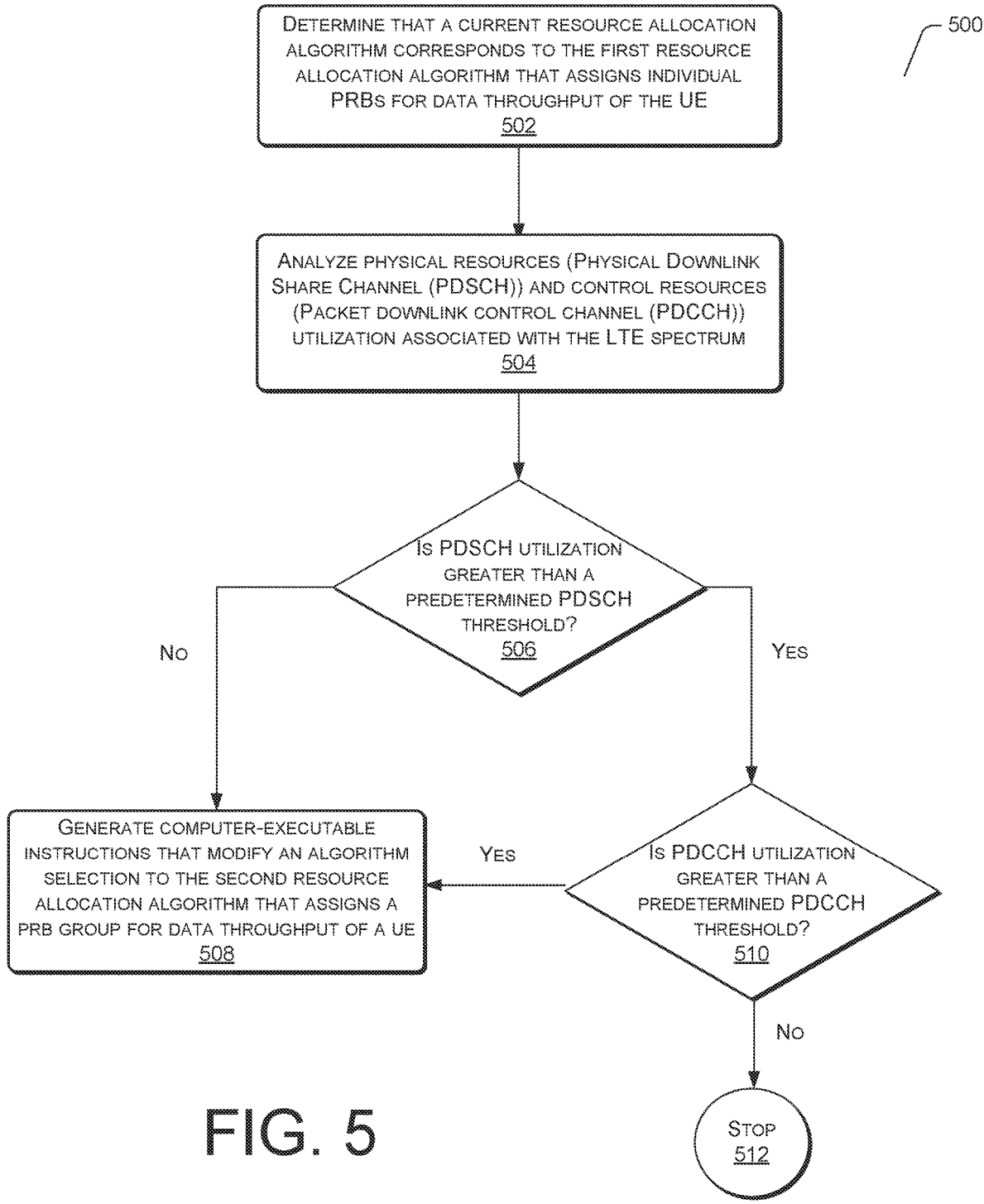
FIG. 5 illustrates a process for detecting and selectively modifying a deployment of the first resource allocation algorithm to assign PRBs for data communications of a UE, within an LTE spectrum.

FIGS. 4 and 5 present processes 400 and 500 that relate to operations of the resource allocation controller 102. Each of the processes 400 and 500 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data algorithms. The order in which the operations are described is not intended to be construed as a limitation, and any number of the described blocks can be combined in any order and/or in parallel to implement the process. For discussion purposes, the processes 400 and 500 are described with reference to the first computing environment 104 and the second computing environment 122 of FIGS. 1A and 1B, respectively.

FIG. 4 illustrates a process for detecting a UE deployed on an LTE spectrum and selecting one of at least two resource allocation algorithms for assigning physical resources and control resources within the LTE spectrum. More specifically, process 400 involves a resource allocation controller that analyzes a real-time or near real-time utilization of physical resources and control resources within an LTE spectrum, and in doing so, selects a resource allocation algorithm that balances a dichotomy of efficiencies between the utilization of physical resources and control resources.

At 402, a resource allocation controller may detect a UE deployed on an LTE spectrum. Specifically, the resource allocation controller may monitor utilization of the LTE spectrum at a near real-time interval via a performance management counter that resides at the base station node. In this example, the resource allocation controller may correspond to an application server that is communicatively coupled to the control plane of the Evolved Packet Core of the core network. Near real-time may correspond to any time delay, such as one second, five seconds, 30 seconds, one minute, and so forth. In contrast, the resource allocation controller may be communicatively coupled to the base station node, and thus monitor utilization of physical and control resources in real-time.

At 404, the resource allocation controller may determine the number of PRBs for data communications of the UE within the LTE spectrum. In one example, the UE may correspond to an NB-IoT device that occupies a frequency band of 180 kHz. In this example, the resource allocation controller may determine that the NB-IoT device need only occupy one PRB for data communications within the LTE spectrum.

At 406, the resource allocation controller may analyze real-time or near real-time utilization of physical resources and control resources within a subframe of the LTE spectrum. For example, the resource allocation controller may determine physical resource utilization by quantifying the number of PRBs used within the PDSCH relative to a total number of PRBs within the PDSCH of a subframe. Similarly, control resource utilization may be determined by the number of CCE used within the PDCCH relative to the total number of CCE within the PDCCH of a subframe.

At 408, the resource allocation controller may determine whether the PDSCH utilization (i.e. usage of PRBs within the PDSCH of the LTE subframe) is greater than or equal to a predetermined PDSCH threshold. The PDSCH threshold may reflect a baseline PRB utilization (i.e. portion of used PRBs relative to total PRBs within the PDSCH of the LTE subframe) above which the PDSH may be considered congested, or unable to maintain a predetermined QoS for data communications.

At 410, the resource allocation controller may determine that the PDSCH utilization is less than the predetermined PDSCH threshold. At this process step, the resource allocation controller may infer that the current utilization of PRBs within the PDSCH does not adversely impact a QoS of data communications within the LTE spectrum. At this process step, the resource allocation controller may generate a set of computer-executable instructions that select the second resource allocation algorithm to assign PRB groups for data communications of UEs. While the second resource allocation algorithm may cause PRBs within a PRB group to be left unused, the fact that the PDSCH utilization is below the predetermined PDSCH threshold indicates that the presence of unused PRBs within the PRB group is unlikely to adversely impact a QoS of data communications within the LTE spectrum.

At 412, the resource allocation controller may determine that the PDSCH utilization is greater than or equal to the predetermined PDSCH threshold. At this process step, the resource allocation controller may infer that the current utilization of PRBs within the PDSCH is impacting a QoS of data communications within the LTE spectrum.

Subsequently, the resource allocation controller may determine whether PDCCH utilization (i.e. control resources of the LTE subframe) is greater than or equal to a predetermined PDCCH threshold. The PDCCH threshold may reflect a baseline utilization of CCE within the PDCCH, above which the PDCCH may be considered congested, or unable to maintain a predetermined QoS for data communications. Utilization of control resource elements is measured as the portion of used resource elements relative to total resource elements within the PDCCH of the LTE subframe that are used to transmit control information (i.e. DCI messages) associated with the allocation of physical resources (i.e. PRB or PRB group) for data communications of a UE.

At 414, the resource allocation controller may determine that the PDCCH utilization is less than the predetermined PDCCH threshold. In other words, the PDCCH has sufficient resource elements available to carry additional control information (i.e. DCI messages) associated with assigning physical resources (i.e. PRBs) to data communications for a UE, without causing congestion or adversely impacting a QoS associated with the LTE spectrum.

In this example, the resource allocation controller may generate a set of computer-executable instructions that select the first resource allocation algorithm to assign individual PRBs within the LTE spectrum for data communications of the UE. Even though the first resource allocation algorithm increases utilization of the PDCCH, a corollary is an improved utilization efficiency of PRBs within the PDSCH, which overall may improve a QoS for data communications within the LTE spectrum.

The resource allocation controller may transmit the set of computer-executable instructions to a packet scheduler at the base station node. Upon receipt, the packet scheduler may schedule data communications of the UE within the PDCCH and PDSCH, pursuant to the first resource allocation algorithm.

Alternatively, referring back to step 412, the resource allocation controller may determine that the PDCCH utilization is greater than the predetermined PDCCH threshold. At this process step, the resource allocation controller may infer that the utilization of resource elements within the PDCCH is relatively high, and any further increase may negate any efficiency derived within the PDSCH from assigning individual PRBs to carry data associated with a UE (i.e. first resource allocation algorithm). Therefore, the resource allocation controller may generate a set of computer-executable instructions that select the second resource allocation algorithm to assign PRB groups for data communications of the UE, as described earlier with reference to process step 410.

FIG. 5 illustrates a process for detecting and selectively modifying a deployment of the first resource allocation algorithm to assign PRBs for data communications of a UE, within an LTE spectrum. The first resource allocation algorithm may be configured to allocate an exact number of individual PRBs for data communications of a UE within the LTE spectrum. Even though the first resource allocation algorithm improves a utilization efficiency of PRBs within the PDSCH, a corollary is an inefficiency created within the PDCCH, due to the additional utilization of resource elements needed to assign individual PRBs within the LTE spectrum to data communications of the UE. In some examples, the balance of efficiencies at the PDSCH and PDCCH may cause the resource allocation controller to modify a selection of the first resource allocation algorithm to the second resource allocation algorithm, whereby the second resource allocation algorithm assigns PRB groups within the LTE spectrum for data communications of the UE.

At 502, the resource allocation controller may detect that a current resource allocation algorithm corresponds to the first allocation algorithm. The resource allocation controller may interact directly with a packet scheduler of the base station node to determine the current resource allocation algorithm. Alternatively, the resource allocation controller may infer the current resource allocation algorithm based on its most recent selection of a resource allocation algorithm.

At 504, the resource allocation controller may analyze real-time or near real-time PDSCH utilization (i.e. physical resource utilization) and PDCCH utilization (i.e. control resource utilization) associated with the LTE spectrum. PDSCH utilization may be determined as a portion of used PRBs relative to total PRBs within the PDSCH of the LTE subframe. PDCCH utilization may be determined as a number of resource elements assigned to carry DCI messages for data communications carried via the PDSCH, relative to a total number of resource elements within the PDCCH of the LTE subframe.

At 506, the resource allocation controller may determine whether the PDSCH utilization (i.e. physical resource utilization) is greater than or equal to a predetermined PDSCH threshold. The PDSCH threshold may reflect a baseline PRB utilization (i.e. the portion of used PRBs relative to total PRBs within the PDSCH of the LTE subframe) above which the PDSH may be considered congested, or unable to maintain a predetermined QoS for data communications.

At 508, the resource allocation controller may determine that the PDSCH utilization is less than the predetermined PDSCH threshold. In other words, the resource allocation controller may infer that the current utilization of PRBs within the PDSCH does not adversely impact a QoS associated with the LTE spectrum.

Therefore, the resource allocation controller may generate a set of computer-executable instructions that modify the selection of the first resource allocation algorithm to the second resource allocation algorithm. Even though the second resource allocation algorithm is configured to allocate additional PRBs to a UE (i.e. allocation of a PRB group to a UE in lieu of individual PRBs), the fact that the PDSCH utilization is below the predetermined PDSCH threshold indicates that the presence of unused PRBs within a PRB group is unlikely to adversely impacting a QoS of data communications within the LTE spectrum.

At 510, the resource allocation controller may determine that the PDSCH utilization is greater than the predetermined PDSCH threshold. In other words, the resource allocation controller may infer that the current utilization of PRBs is impacting the QoS of data communications within the LTE spectrum.

Subsequently, the resource allocation controller may determine whether the PDCCH utilization is greater than or equal to the predetermined PDCCH threshold.

At 512, the resource allocation controller may determine that the PDCCH utilization is less than the predetermined PDCCH threshold. In other words, the PDCCH has sufficient resource elements available to carry control information associated with assigning individual PRBs for data communications of a UE, without causing congestion or adversely impacting a QoS associated with the LTE spectrum.

Therefore, the resource allocation controller may end process 500 and maintain the current use of the first resource allocation algorithm in assigning an exact number of individual PRBs for data communications of a UE, within the LTE spectrum.

Alternatively, referring back to step 510, the resource allocation controller may determine that the PDCCH utilization is greater than or equal to the predetermined PDCCH utilization. At this process step, the resource allocation controller may infer that the utilization of resource elements within the PDCCH is relatively high, and any further increase may negate any efficiency derived from assigning individual PRBs to data communications for a UE (i.e. first resource allocation algorithm). Therefore, the resource allocation controller may generate a set of computer-executable instructions that modify the selection of the first resource allocation algorithm to the second resource allocation algorithm, as described earlier with reference to process step 508.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A computer-implemented method comprising:
monitoring network traffic at a network node;
determining that an instance of the network traffic is associated with a device;
determining a user data channel threshold that is configured to maintain a predetermined Quality of Service (QoS) when a utilization of a user data channel satisfies the user data channel threshold;
determining expected fluctuations in the network traffic over a time interval;
based on the expected fluctuations in the network traffic over the time interval, determining a hysteresis value that accounts for anticipated changes in the utilization of the user data channel;
determining that the utilization of the user data channel associated with the network traffic at the network node satisfies the user data channel threshold within the hysteresis value; and
in response to the utilization of the user data channel satisfying the user data channel threshold within the hysteresis value, transmitting a message to the network node, the message to assign a network resource to carry data associated with the device.

2. The method of claim 1, comprising:
determining a control data channel threshold that is configured to maintain the predetermined QoS when a utilization of the control data channel satisfies the control data channel threshold;
based on the expected fluctuations in the network traffic over the time interval, determining an additional hysteresis value that accounts for anticipated changes in the utilization of the control data channel; and
determining that the utilization of the control data channel associated with the network traffic at the network node satisfies the control data channel threshold within the additional hysteresis value,
wherein, transmitting the message is further based at least in part on the utilization of the control data channel satisfying the control data channel threshold within the additional hysteresis value.

3. The method of claim 1, wherein monitoring the network traffic at the network node occurs at a first point-in-time, and comprises:
determining, at a second point-in-time that follows the first point-in-time, that the utilization of the user data channel satisfies the user data channel threshold within the hysteresis value; and
transmitting an additional message to the network node, the additional message to assign a network resource group to carry data associated with the device.

4. The method of claim 1, wherein monitoring the network traffic at the network node occurs at a first point-in-time, and comprises:
determining, at a second point-in-time that follows the first point-in-time, that the utilization of the control data channel satisfies a control data channel threshold within an additional hysteresis value; and
transmitting an additional message to the network node, the additional message to assign a network resource group to carry data associated with the device.

5. The method of claim 1, wherein monitoring the network traffic at the network node occurs via a counter at the network node.

6. The method of claim 1, wherein the network traffic is LTE traffic.

7. The method of claim 1, wherein the network node is a base station node.

8. The method of claim 1, wherein the user data channel is a physical downlink share channel.

9. The method of claim 1, wherein the control data channel is a physical downlink control channel.

10. The method of claim 1, wherein the device is a narrow band internet of things device.

11. The method of claim 1, wherein the network resource is a physical resource block.

12. The method of claim 1, wherein the message is a downlink control information message.

13. A system, comprising:
one or more processors; and
memory coupled to the one or more processors, the memory including one or more modules that are executable by the one or more processors to perform the acts comprising:
monitoring network traffic at a network node;
determining that an instance of the network traffic is associated with a device;
determining a user data channel threshold that is configured to maintain a predetermined Quality of Service (QoS) when a utilization of a user data channel satisfies the user data channel threshold;
determining expected fluctuations in the network traffic over a time interval;
based on the expected fluctuations in the network traffic over the time interval, determining a hysteresis value that accounts for anticipated changes in the utilization of the user data channel;

determining that the utilization of the user data channel associated with the network traffic at the network node satisfies the user data channel threshold within the hysteresis value; and in response to the utilization of the user data channel satisfying the user data channel threshold within the hysteresis value, transmitting a message to the network node, the message to assign a network resource to carry data associated with the device.

14. The system of claim 13, wherein the acts comprise:

determining a control data channel threshold that is configured to maintain the predetermined QoS when a utilization of the control data channel satisfies the control data channel threshold;

based on the expected fluctuations in the network traffic over the time interval, determining an additional hysteresis value that accounts for anticipated changes in the utilization of the control data channel; and determining that the utilization of the control data channel associated with the network traffic at the network node satisfies the control data channel threshold within the additional hysteresis value, wherein, transmitting the message is further based at least in part on the utilization of the control data channel satisfying the control data channel threshold within the additional hysteresis value.

15. The system of claim 13, wherein monitoring the network traffic at the network node occurs at a first point-in-time, and comprises:

determining, at a second point-in-time that follows the first point-in-time, that the utilization of the user data channel satisfies the user data channel threshold within the hysteresis value; and transmitting an additional message to the network node, the additional message to assign a network resource group to carry data associated with the device.

16. The system of claim 13, wherein monitoring the network traffic at the network node occurs at a first point-in-time, and comprises:

determining, at a second point-in-time that follows the first point-in-time, that the utilization of the control data channel satisfies a control data channel threshold within an additional hysteresis value; and transmitting an additional message to the network node, the additional message to assign a network resource group to carry data associated with the device.

17. The system of claim 13, wherein monitoring the network traffic at the network node occurs via a counter at the network node.

18. The system of claim 13, wherein the user data channel is a physical downlink share channel.

19. The system of claim 13, wherein the control data channel is a physical downlink control channel.

20. One or more non-transitory computer-readable media storing computer-executable instructions that, when executed on one or more processors, cause the one or more processors to perform acts comprising:

monitoring network traffic at a network node;

determining that an instance of the network traffic is associated with a device;

determining a user data channel threshold that is configured to maintain a predetermined Quality of Service (QoS) when a utilization of a user data channel satisfies the user data channel threshold;

determining expected fluctuations in the network traffic over a time interval;

based on the expected fluctuations in the network traffic over the time interval, determining a hysteresis value that accounts for anticipated changes in the utilization of the user data channel;

determining that the utilization of the user data channel associated with the network traffic at the network node satisfies the user data channel threshold within the hysteresis value; and in response to the utilization of the user data channel satisfying the user data channel threshold within the hysteresis value, transmitting a message to the network node, the message to assign a network resource to carry data associated with the device.

* * * * *